United States Patent Office 2,906,739
Patented Sept. 29, 1959

2,906,739
PROCESS FOR THE PRODUCTION OF POLY-ETHYLENE POLYSULFIDE

Hans Brückner, Burgkirchen (Alz), and Kurt Weissörtel, Burghausen (Salzach), Germany, assignors to Farbwerke Hoechst Aktiengesellschaft vormals Meister Lucius & Brüning, Frankfurt am Main Hochst, Germany, a company of Germany No Drawing. Application January 3, 1956
Serial No. 556,775

Claims priority, application Germany January 5, 1955

2 Claims. (Cl. 260—79.1)

The present invention relates to a new and improved process for producing polyethylene polysulfide. More particularly the process of the present invention produces polyethylene polysulfide in finely-divided powder form.

In accordance with the prior art teaching, sodium polysulfide and ethylene dichloride polymerize when a solution of excess sodium polysulfide is brought in contact with ethylene dichloride in the presence of a dispersing agent such as magnesium hydroxide. By excess as used in the prior art is meant from about 2 to 10% above that stoichiometrically required. The latex which results is washed free of soluble metallic salts by repeated decantation and washing steps. Following this, the latex is coagulated by acidification. After this, the resulting spongy mass is freed of its acid content by pressing and subsequent washing operations on rolling mills. The resultant dry material is in sheet form. In order to vulcanize this sheet product and to develop maximum strength and toughness, various agents such as zinc oxide and carbon black must be milled into the polymer. Extensive milling is required to incorporate these agents uniformly throughout the polymer.

As will be appreciated, the above process is complicated by many steps such as washing, rolling, and extensive milling because of the nature of the spongy mass obtained. However, if the polymer could be recovered as a precipitate from the polymerization mass, it could be readily washed free of its acid content to obtain a dry powder, easily intermixed with vulcanizing and other agents and subsequently formed into a sheet or other product form.

In accordance with the process of the present invention, it has been discovered that polyethylene polysulfide containing approximately 82% sulfur, i. e., in theory $(C_2H_4S_4)_n$, can be produced in powder form and that the products produced therefrom have properties equally as good as the properties of the prior art produced products. As stated, it is necessary to use generally from 2 to 10% excess polysulfide in accordance with the prior art teaching in order to prevent the formation of a viscous liquid polymer, i. e., to obtain a rubber-like polymer. In accordance with the present invention, it is not only necessary to use a stoichiometric excess of polysulfide which is above that normally used by the prior art but it is also necessary to employ ethylene chloride having a chromium number less than 500, preferably less than 250. By "chromium number" is meant the milligram consumption of $CrO_3$ per ten cubic centimeters (at standard conditions of temperature and pressure) of ethylene dichloride. Pure ethylene dichloride has a chromium number of zero. The presence of an oxidizable impurity or contaminant in ethylene dichloride results in $CrO_3$ consumption and the degree of consumption is an indication of the amount of such impurity. Common contaminants as a result of by-product production during the synthesis of ethylene dichloride include unsaturated compounds as well as ethylene chlorohydrin. Although such contaminants as ethylene chlorohydrin do not enter into the polymerization reaction, it has been found in accordance with this invention that their presence in excess of that indicated by a chromium number of 500 prevents the recovery of a pulverulent polyethylene polysulfide product. Furthermore, use of a stoichiometric excess of polysulfide of less than 20% by weight, irrespective of the chromium number, will not produce a powdered polyethylene polysulfide product.

In accordance with the present invention, when a solution of a soluble polysulfide containing at least 20% by weight excess polysulfide, preferably containing magnesium hydroxide as a dispersing agent, is contacted with ethylene dichloride having a chromium number of less than 500, polyethylene polysulfide results. Upon settling, supernatant liquid containing soluble salts is drawn off to obtain the polymer contaminated with residual electrolytes. Upon addition of water and adjustment of the pH to a value up to approximately 4.0, a product substantially free of electrolytes is obtained. This in turn may be washed on a filter, centrifuged and heated to obtain a dry product. The resultant dry product is a free-flowing powder of average particle-size substantially within the range 8–15$\mu$.

The foregoing description of the present invention, including the following example, is for the purpose of illustration only and is not limiting to the scope thereof which is set forth in the claims.

Example

Crystalline sodium sulfide in an amount of 400 kg. and 150 kg. of sulfur are dissolved in water while heating in accordance with the known method of producing sodium polysulfide to obtain 700 liters of solution. Upon the addition of more water, the solution is adjusted to a density of 1.2458 (a 2-molar solution). To this solution are added 17 kg. of 50% caustic soda and 22 kg. of crystalline magnesium chloride in 22 kg. of water. This mixture which now contains finely-divided magnesium hydroxide is heated to about 65° C. and has 141 kg. ethylene dichloride (chromium number 100) added while stirring at a rate that the reaction temperature does not exceed 70–75° C. Upon the completion of the ethylene dichloride addition, the temperature is increased to 90° C. and stirring continued for another hour. Upon settling, the electrolyte containing supernatant liquid is drawn off and the residual solid contents diluted with water. Upon acidification with hydrochloric acid to a pH of 4.0, the resultant precipitated solid is washed on a suction filter and then is dried at a temperature of approximately 35° C. As a result, there is obtained a finely-divided powdered polyethylene polysulfide product weighing approximately 210 kg. with a sulfur content of about 82%.

We claim:
1. A process for producing powdered polyethylene polysulfide containing approximately 82% sulphur, calculated on $(C_2H_4S_4)_n$ and having an average particle size substantially within the range of 8–15$\mu$ comprising the steps of contacting ethylene dichloride of a chromium number of less than 500, said chromium number being the number of milligrams of chromium trioxide consumed by oxidizable contamination in 10 ccm. ethylene dichloride, with a soluble polysulfide obtained by heating crystalline sodium sulfide with sulphur in water, in an aqueous solution which contains the soluble polysulfide in a stoichiometric excess of not less than 20% by weight and is adjusted with water to a 2-molar concentration, in the presence of, as acid-soluble dispersing agent, finely divided magnesium hydroxide, maintaining said solution at a temperature not to exceed 70–75° C. while the ethylene dichloride is added to said solution, increasing the temperature of said solution to about 90° C. after the ethylene dichloride is added, separating the resultant solid and liquid por- tions, washing the solid portion in water acidified to a pH of approximately 4.0, separating resultant precipitate, washing said precipitate and heating the precipitate to a dry, free-flowing powder.

2. The process of claim 1 wherein the chromium number of ethylene dichloride is less than 250.

References Cited in the file of this patent

UNITED STATES PATENTS 1,923,392    Patrick   ---------------- Aug. 22, 1933